United States Patent
Lorgouilloux (10) Patent No.: US 10,934,210 B2
(45) Date of Patent: Mar. 2, 2021

(54) METHOD FOR PRODUCING A HIGHLY POROUS FINE POWDERED SLAKED LIME COMPOSITION, AND PRODUCT OBTAINED THEREFROM

(71) Applicant: S. A. Lhoist Recherche et Developpement, Ottignies-Louvain-la-Neuve (BE)

(72) Inventor: Marion Lorgouilloux, Strepy Bracquegnies (BE)

(73) Assignee: S. A. Lhoist Recherche et Developpement, Ottignies-Louvain-la (BE)

(*) Notice: Subject to any disclaimer, the term of this patent is extended or adjusted under 35 U.S.C. 154(b) by 118 days.

(21) Appl. No.: 16/309,783

(22) PCT Filed: Jun. 23, 2017

(86) PCT No.: PCT/EP2017/065521
§ 371 (c)(1),
(2) Date: Dec. 13, 2018

(87) PCT Pub. No.: WO2017/220773
PCT Pub. Date: Dec. 28, 2017

(65) Prior Publication Data
US 2019/0127273 A1    May 2, 2019

(30) Foreign Application Priority Data

Jun. 24, 2016 (BE) .................................. 2016/5471
Jun. 24, 2016 (WO) ................. PCT/EP2016/064740

(51) Int. Cl.
C04B 2/04    (2006.01)
C04B 2/06    (2006.01)
(Continued)

(52) U.S. Cl.
CPC .............. C04B 2/045 (2013.01); B01D 53/02 (2013.01); B01J 20/041 (2013.01);
(Continued)

(58) Field of Classification Search
CPC ... C01F 11/02; C01P 2004/03; C01P 2004/61; C04B 2/04
See application file for complete search history.

(56) References Cited

U.S. PATENT DOCUMENTS 5,173,279 A    12/1992  Dumont et al.
5,223,239 A    6/1993   Moran et al.
(Continued)

FOREIGN PATENT DOCUMENTS

WO    1997/014650    4/1997

OTHER PUBLICATIONS

PCT/EP2017/065521, International Patent Appl. Search Report, 2 pages, dated Aug. 11, 2017.

*Primary Examiner* — Hoa (Holly) Le
(74) *Attorney, Agent, or Firm* — Whitaker Chalk Swindle & Schwartz PLLC; Charles Gunter (57) ABSTRACT

The present invention relates to a method for producing a highly porous fine powdery slaked lime composition, comprising a fluidification step for forming said highly porous fine powdery slaked lime composition having an Alpine fluidity greater than 50% and which is carried out in a dryer/grinder chosen from the group consisting of a pin-type dryer/grinder, a cage-type dryer/grinder, an instantaneous dryer/disagglomerator and a combination of these until the powdery slaked lime composition has a non-solid residual-phase content of less than or equal to 3.5% by weight and greater than or equal to 0.3% by weight, as well as the product obtained therefrom.

5 Claims, 1 Drawing Sheet

(51) Int. Cl.
  *B01J 20/28*   (2006.01)
  *B01J 20/04*   (2006.01)
  *C01F 11/02*   (2006.01)
  *B01D 53/02*   (2006.01)
  *B01J 20/30*   (2006.01)

(52) U.S. Cl.
  CPC ... *B01J 20/28004* (2013.01); *B01J 20/28011* (2013.01); *B01J 20/28016* (2013.01); *B01J 20/28059* (2013.01); *B01J 20/28071* (2013.01); *B01J 20/28085* (2013.01); *B01J 20/3021* (2013.01); *B01J 20/3085* (2013.01); *C01F 11/02* (2013.01); *C04B 2/04* (2013.01); *C04B 2/06* (2013.01); *B01D 2251/404* (2013.01); *B01D 2251/604* (2013.01); *B01D 2253/10* (2013.01); *B01D 2253/306* (2013.01); *B01D 2258/0283* (2013.01); *C01P 2004/60* (2013.01); *C01P 2004/61* (2013.01); *C01P 2006/12* (2013.01); *C01P 2006/14* (2013.01); *C01P 2006/20* (2013.01); *C01P 2006/32* (2013.01); *C01P 2006/80* (2013.01)

(56)  References Cited

U.S. PATENT DOCUMENTS

| | | | |
|---|---|---|---|
| 6,322,769 B1* | 11/2001 | Langelin | C04B 2/04 |
| | | | 423/635 |
| 10,669,199 B2* | 6/2020 | Chini | C04B 2/08 |
| 2009/0229462 A1* | 9/2009 | Laudet | B01J 20/048 |
| | | | 95/131 |
| 2009/0246117 A1 | 10/2009 | Tilquin et al. | |
| 2017/0113945 A1* | 4/2017 | Fukuoka | C08K 3/26 |
| 2018/0155240 A1* | 6/2018 | Chini | C04B 2/06 |
| 2019/0193049 A1* | 6/2019 | Lorgouilloux | B01J 20/28069 |
| 2020/0188846 A1* | 6/2020 | Tate | C04B 2/06 |

\* cited by examiner

METHOD FOR PRODUCING A HIGHLY POROUS FINE POWDERED SLAKED LIME COMPOSITION, AND PRODUCT OBTAINED THEREFROM

The present invention relates to a method for producing a highly porous fine powdery slaked lime composition, comprising the steps consisting of introducing quicklime into a feeding zone of a hydrator, introducing water into the feeding zone of the hydrator, slaking said quicklime in a slaking zone of the hydrator by means of a quantity of water that is sufficient to obtain a slaked lime having a non-solid residual-phase content of between 15% and 55% by weight, preferably between 15% and 35% by weight, and drying and grinding said slaked lime in order to form the powdery slaked lime composition.

"Highly porous fine powdery slaked lime composition" means, within the meaning of the present invention, a powdery slaked lime composition having a high BET specific surface area and a high BJH pore volume, which means a BET specific surface area obtained by sorption of nitrogen greater than or equal to 25 m$^2$/g and a total BJH pore volume, consisting of pores with a diameter of less than 1000 Å, greater than or equal to 0.15 cm$^3$/g.

"Powdery slaked lime composition" means, in the present invention, a slaked lime composition composed of free individual particles of calcium hydroxide.

"Fine powdery slaked lime composition" means, according to the present invention, a slaked lime composition in powder form having a particle size dos of less than 200 μm, in particular less than 150 μm. In this light, the powdery slaked lime composition differs in particular from granules or pebbles, which have a larger particle size.

Calcium oxide, CaO is often referred to as "quicklime", while calcium hydroxide, Ca(OH)$_2$, is referred to as "hydrated lime" or "slaked lime", the two compounds sometimes being referred to informally as "lime". In other words, lime is an industrial product based respectively on calcium oxide or hydroxide.

"Quicklime" means a mineral solid material the chemical composition of which is mainly calcium oxide, CaO. Quicklime is generally obtained by the calcination of limestone (mainly CaCO$_3$).

Quicklime may also contain impurities such as magnesium oxide, MgO, sulphur trioxide, SO$_3$, silica, SiO$_2$, or alumina, Al$_2$O$_3$, etc, the sum of which is an amount of a few percent by weight. The impurities are expressed here in their oxide form but of course may appear in various phases. Quicklime generally also contains a few percent by weight of residual limestone, referred to as uncooked residues.

The appropriate quicklime according to the present invention may comprise MgO in a quantity lying in the range from 0.5% to 10% by weight, preferably less than or equal to 5% by weight, more preferably less than or equal 3% by weight, above all preferably less than or equal to 1% by weight with respect to the total weight of the quicklime.

Typically, in order to form slaked lime, quicklime is used in the presence of water. The calcium oxide in the quicklime reacts rapidly with the water in order to form calcium dihydroxide Ca(OH)$_2$, in the form of slaked lime or hydrated lime, in a reaction referred to as a hydration or slaking reaction that is highly exothermic. Hereinafter, calcium dihydroxide will be simply referred to as calcium hydroxide.

Slaked lime may therefore contain the same impurities as those of the quicklime from which it is produced.

The slaked lime according to the present invention may also comprise Mg(OH)$_2$ in a quantity lying in the range from 0.5% to 10% by weight, preferably less than or equal to 5% by weight, more preferably less than or equal 5% by weight, above all preferably less than or equal to 1% by weight with respect to the total weight of the slaked lime.

Slaked lime may also comprise calcium oxide, which may not have been completely hydrated during the slaking step, or calcium carbonate CaCO$_3$. The calcium carbonate may come from the initial limestone (uncooked) from which said slaked lime is obtained (by means of calcium oxide), or come from a partial carbonation reaction of the slaked lime by contact with an atmosphere containing CO$_2$.

The quantity of calcium oxide in the slaked lime according to the present invention is generally less than or equal to 3% by weight, preferably less than or equal to 2% by weight and more preferably less than or equal to 1% by weight with respect to the total weight of slaked lime.

The quantity of CO$_2$ in the slaked lime (mainly in the form of CaCO$_3$) according to the present invention is less than or equal to 5% by weight, preferably less than or equal to 3% by weight, more preferably less than or equal to 2% by weight, with respect to the total weight of the slaked lime according to the present invention.

The slaking reaction is generally carried out in a hydrator, in which quicklime is brought upstream of the direction of slaking, that is to say the direction with which the lime is transported along and in the hydrator. The slaked lime is removed downstream of the direction of slaking. Transport means, such as a horizontal shaft equipped with mixing blades for example, enable the lime to be transported in the direction of slaking in the hydrator, from the quicklime feed as far as the removal of the slaked lime. The transport means also afford a homogeneous mixing of the lime undergoing hydration and therefore improve contact between the water and the lime in the hydrator and avoid the formation of hot spots.

A hydrator may be divided into various consecutive zones. The first is referred to as the feed or mixing zone and constitutes the part of the hydrator situated upstream of the slaking direction, in which the quicklime and water are introduced and mixed together. The second zone, referred to as the slaking zone, represents the part of the hydrator in which the slaking reaction occurs mainly, that is to say in which the majority of the lime is chemically transformed into slaked lime and in which the majority of the steam is generated, in particular because of this exothermic reaction.

Various types of hydration method and hydrator exist, according to the properties of the quicklime used, but also the expected yield of the slaking reaction and the required properties of the slaked lime that results therefrom.

In order to achieve a good hydration yield, several parameters must be taken into account, such as the residence time of the lime in the hydrator, the reactivity to water of the quicklime, the location of the quicklime and of the water feed along the hydrator, and also the quantity of water with respect to the quantity of lime.

The reactivity to water of the quicklime is generally characterised and measured by the procedure indicated in the European standard EN459-2 and is often quantified by the value $t_{60}$, which is the time necessary for reaching a temperature of 60° C. for a volume of water of 600 cm$^3$ initially at 20° C., with the addition of 150 g of quicklime.

During the hydration of the quicklime, more or less fine particles are produced, according to the size of particles of the quicklime supplied, but also according to the speed of the hydration reaction, the latter being explosive and producing small crackling exploded particles. A well controlled slaking reaction is therefore difficult to obtain despite its importance for producing the required particle size (ranging from fine particles to the generation of lime grains, corresponding to particles that are agglomerated together), and the required porosity. In this regard, the temperature inside the hydration or slaking zone is also a key factor that governs the hydration reaction.

Slaked lime compositions are normally obtained industrially by various methods according to the quantity of water used with respect to the lime.

In a first production method known as "dry slaking mode", water is added to the hydrator in a quantity limited to what is necessary to completely hydrate the quicklime, taking into account the fact that some will evaporate during the slaking reaction, because of the exothermic character of this reaction.

At the discharge from the hydrator, the resulting slaked lime product is a standard slaked lime composition in the form of powder having a BET specific surface area generally between 12 and 20 m$^2$/g and in general comprising less than 2% by weight or even less than 1.5% by weight moisture (free water).

Standard slaked limes are generally used in a large number of industrial applications such as water treatment, sludge treatment, the treatment of combustion gases, agriculture, construction, etc.

For some of these applications, the properties of the slaked lime are particularly critical for obtaining a good performance. For example, for the treatment of combustion gases, lime is used as a sorbent for several gaseous pollutants such as HCl, HR, SOx or NOx. However, such lime, once it has captured these pollutants, becomes a by-product that must be processed or recycled. Consequently manufacturers seek high-performance sorbents in order to reduce the quantity of by-products, the processing of which is expensive.

One way of increasing the performance of the lime consists of increasing the proportion of hydrated lime that will actually come into contact with the pollutants to be captured, in particular by reducing the size of the particles and/or increasing the specific surface area and/or the pore volume of the hydrated lime.

Thus, during the past few years, more and more products and production methods have been developed in order to control the properties of the slaked lime, in particular its particle size, its pore volume and/or its specific surface area, in order to improve its sorption capacity.

A first approach consists of producing a slaked lime having a high specific surface area, by slaking quicklime with an alcohol, in particular as described in the document U.S. Pat. No. 5,492,685, or in the presence of particular additives, such as a (di-, tri- or poly-)ethylene glycol or a (di-, tri- or poly-) ethanolamine, in particular as described in the document WO 9209528.

Another method for producing slaked lime having a high specific surface area consists of slaking the quicklime with an excess of water so as to obtain, at the discharge from the hydrator, a wet slaked lime composition having a residual moisture content of between 15% and 35% by weight. The wet slaked lime composition is next further dried in a drying device in order to reduce the moisture content and to form a dry powdery slaked lime composition. This method is generally referred to as "semi-wet method" and is in particular described in the documents WO 97/14650 and U.S. Pat. No. 2,894,820.

More precisely, in the document WO 97/14650, in the name of the applicant, the drying step is followed by or simultaneously combined with a grinding step so as to control the size of the slaked lime particles. The resulting powdery slaked lime composition consists essentially of dried calcium hydroxide particles having a residual moisture content below 2% by weight of the total composition, a high specific surface area (greater than 30 m$^2$/g) with a high pore volume (total pore volume by desorption of nitrogen of at least 0.1 cm$^3$/g for pores having a diameter of less than 10000 Ångströms). This lime composition also has an Alpine fluidity of between 40% and 50% and is described as having excellent performance for treating combustion gases in installations comprising a bag filter.

However, the document describes manufacturing to a laboratory scale or to a pilot scale. Furthermore, during the past decades, environmental legislation has in general been considerably reinforced, in terms of quantity of pollutant allowed in combustion gases and in terms of processing of by-products, which therefore obliges manufacturers to find solutions with an improved sorption capacity.

Furthermore, it has been discovered that the powdery slaked lime composition obtained with these "semi-wet methods" have insufficient fluidity for pneumatic transport, in particular when they have a high pore volume. This problem was in particular emphasised in the document JP 4341229, which proposes, as a solution, adding an organic additive having two alcohol hydroxyl groups or more, in a quantity of 0.05% to 2% by weight with respect to the weight of slaked lime.

The insufficient fluidity of the powdery slaked lime composition gives rise to a recurrent problem of phenomena of clogging an adhesion during its production process and its storage, but also during its transport and subsequent use, which are responsible for additional maintenance that gives rise to additional costs and a drop in production efficiency.

Furthermore, a powder that is not fluid has a tendency to stick to the walls of the receptacle and is then difficult to eliminate from these walls, therefore leading to the loss of a not insignificant quantity of product. Furthermore, if these deposits are present on the walls of the transport lines, the application of the powdery slaked lime is compromised because of blockages that are difficult to eliminate.

This is because, during its production method or during its subsequent use in industrial applications, the powdery slaked lime composition is manipulated and transported, in particular by screws or blades or by air in conduits where the particles are distributed in the gaseous phase. Subsequently the powdery slaked lime composition is generally stored in the compressed state, for example in silos.

The fluidity of a powdery compound, such as a powdery slaked lime composition, depends on many parameters, some of which are difficult to control. However a variation in the fluidity of the powdery slaked lime composition is unacceptable in an Industrial product since this may lead to variations in terms of productivity, but also to unpredictable phenomena of dogging in the installation.

The fluidity characteristics of a powder are, among other things, governed by the size of the particles making up the powder (see the article "Flow properties of powders and bulks solids", Dietmar Schulze http://dietmar-schulze.de/grdle.1.pdf).

In particular, the fluidity of a powder generally decreases when the size (for example the diameter) of the particles constituting the powder decreases.

The size of the particles making up the powdery slaked lime composition depends on various parameters.

The first parameter influencing the size of the particles is the particle size of the starting quicklime that is used to form the slaked lime. Furthermore, the speed of the hydration reaction and the temperature in the hydrator are also essential factors that govern the hydration reaction and consequently the size of the size of the particles making up the final powdery slaked lime composition.

Obtaining a method capable of producing a powdery slaked lime composition with controlled properties reproducible over time is therefore difficult since this depends on many parameters that are difficult to control during the production process.

It is therefore necessary to arrive at a way of preparing a highly porous fine powdery slaked lime, having improved sorption capacities, which can be achieved industrially and has controlled properties that are reproducible over time and is easy to manipulate in order to avoid phenomena of clogging and adhesion during the production process, but also during storage, transport and subsequent use of the powder.

To solve this problem, the invention proposes a method as mentioned at the start, characterised in that said drying and grinding steps are performed simultaneously and are a single step of fluidification of the slaked lime in order to form said highly porous fine powdery slaked lime composition having an Alpine fluidity greater than 50%, the Alpine fluidity AF being defined by the equation $$AF = \frac{m_i - m_{R90(T_{15};\ P_{100})}}{m_i - m_{R90(T_{120};\ P_{150})}} \cdot 100$$

where:
- $m_i$ is the is the initial mass of 50 g of powder distributed over a 90 μm sieve;
- $m_{R90(T_{15};\ P_{100})}$ is the mass of residues of material on the sieve after 15 seconds with a negative pressure at 100 mm of manometric liquid of density 0.88;
- $mR_{90(T_{120};\ P_{150})}$ is the mass of residues of material on the sieve after 15 seconds with a negative pressure at 100 mm of manometric liquid of density 0.88 and after 120 seconds with a negative pressure at 150 mm of manometric liquid of density 0.88;

said drying and grinding steps being carried out in a dryer/grinder chosen from the group consisting of a pin-type dryer/grinder, a cage-type dryer/grinder, an instantaneous dryer/disagglomerator and a combination of these until the highly porous fine powdery slaked lime composition has a residual non-solid phase content, measured by a loss-on-ignition test at 180° C., less than or equal to 3.5% by weight, preferably less than or equal to 3% by weight, in particular less than or equal to 2.5% by weight, especially less than or equal to 2% by weight and greater than or equal to 0.3% by weight, preferably greater than or equal to 0.5% by weight, with respect to the total weight of the powdery slaked lime composition.

Suitable dryer/grinders according to the present invention are drying/grinding devices in which the drying and grinding steps are carried out simultaneously and within a period of time lying between a few seconds and a few minutes (Instantaneous dryer/grinder). In this regard, the drying/grinding devices according to the present invention differ appreciably from devices carrying out indirect drying, such as a drum grinder, a disc grinder or a blade grinder, drying under vacuum, lyophilisation or fluidised-bed drying.

"Instantaneous dryer/disagglomerator" means, according to the present invention, an instantaneous drying device in which there is a rotor or rotary blades at the bottom of the drying chamber that fluidises the product and creates turbulence in the hot airflow that enters the drying chamber tangentially. Because of this, the wet (agglomerated) slaked lime is quickly dispersed and disintegrated into dry fine particles. The resulting fine particles emerge from the drying chamber from its top part while the coarser particles remain in the chamber for additional drying and disagglomeration.

Examples of suitable instantaneous dryer/disagglomerators according to the present invention comprise in particular the Anhydro Spin Flash Dryere dryer marketed by SPX Flow, the Drymeister® instantaneous dryer marketed by Hosokawa Micron Group or the Swirl Fluidiser™ dryer marketed by GEA Group.

The method according to the invention affords a maintenance or even improvement of the sorption properties of the powdery slaked lime composition while making the method easier. This is because, against all expectations, it has been found that the execution of the drying and grinding step simultaneously in a dryer/grinder chosen from the group consisting of a pin-type dryer/grinder, a cage-type dryer/grinder or an instantaneous dryer/disagglomerator as previously specified does not reduce the porosity characteristics of the slaked lime composition, quite the contrary. It has also been possible, by performing the drying step and the grinding step together, to improve the fluidity properties of the slaked lime composition while achieving the required fineness.

This is because a dryer and a grinder are devices that can in particular influence the size distribution, but also the shape of the particles of the powdery slaked lime, and consequently influence the fluidity of the powder. Furthermore, because of the high temperature during the drying of the powder, the internal structure of the powdery slaked lime may also be modified and consequently the drying step may also damage the porosity characteristics of the powder. Grinding is also a step that may have a negative impact on the porosity characteristics of the powder.

"Fluidification step" means, according to the present invention, a step that makes a powdery composition fluid.

In general, in order to further improve the sorption properties of the powdery slaked lime composition, it is known that it is necessary to reduce the particle size. This is because powdery slaked lime compositions comprise smaller particles having greater treatment efficacy. More precisely, the treatment of the combustion gases is improved because of better dispersion of the powdery composition in the gaseous phase (the combustion gas) and a more rapid contact between the pollutants and the lime particles of the composition. Furthermore, the smaller particles have a larger external contact surface area, thus increasing the proportion of hydrated lime that will actually come into contact with the pollutants to be captured.

However, the fluidity of a powder generally decreases when the size of the particles making up this powder decreases. The smaller particles are known to cause a reduction in the fluidity of the powder because of the high interactions between the particles, which generate cohesion of the powder. This is in particular illustrated in Geldart et at, which teaches us that the flow properties of a powder measured with different appliances for measuring the behaviour of the flow indicate a more difficult flow behaviour when the particle size is reduced. This is because this document demonstrates that the Warren Spring Bradford cohesion tester (WSBCT), the Johanson cohesion indicator, the poured angle of repose and the Jenike cohesion all show an increase in their value with a reduced particle size (Geldart, D; Abdulla, C E; Verlinden, A, Characterisation of Dry Powders, *Powder Technol.* 2009, 190 (1-2), 70-74).

Consequently, up to the present time, a person skilled in the art has always been forced to make a compromise between improved sorption properties and sufficient fluidity of his powdery absorbent.

"Fluidity", sometimes called "pourability", means, in the present invention, the ability of a powder to flow freely and evenly in the form of individual particles.

The fluidity of the powdery slaked lime composition according to the present invention is measured on an Alpine air jet sieving device. This Alpine fluidity characterises the static fluidity of a powder and is determined by the speed of passage of the particles having a diameter of less than 90 μm through a 90 μm sieve (170 mesh) through the action of aspiration. The Alpine fluidity expressed as a percentage corresponds to the ratio between the weight of the fraction below 90 μm that has passed through the sieve in 15 seconds (with a negative pressure of 100 mm of manometric liquid of density 0.88) and the total weight of the fraction below 90 μm that has passed through the sieve after an additional 2 minutes (with a negative pressure of 150 mm of manometric liquid of density 0.88).

The behaviour of a powder in a storage silo can be simulated with another method using a rheometer for powder, such as a Brookfield powder flow tester (PFT) in accordance with ASTM D6128. In this method, a powder sample introduced into the equipment is subjected to compacting increasing with time. For each compression step (principal consolidation stress), a specific torque is applied to the powder until failure (unconfined failure stress). The response of the powder to the force applied is recorded by computer, which evaluates the static cohesion of the sample tested. The results are expressed by a curve which is compared with the ASTM references.

The powdery slaked lime composition according to the invention is also characterised by a dynamic fluidity that can be measured by a Granudrum apparatus. In this method, a certain quantity of powdery material is placed in a drum having transparent windows, which is rotated and accelerated in steps from 0 to 20 rev/min, and then decelerated in steps. The form of the heap of powder in rotation (air/powder interface) in the drum is analysed by an algorithm. A dynamic flow angle and a dynamic cohesion index are determined for each rotation speed.

It has been identified in the present invention that, in order to obtain a powdery slaked lime composition with a dynamic fluidity (measured by a Granudrum) sufficient to prevent phenomena of clogging and adhesion during transport and subsequent industrial use, said powdery slaked lime composition must have an Alpine fluidity greater than 50%.

It was therefore very unexpected to arrive at a highly porous powdery slaked lime composition having an Alpine fluidity greater than 50% while at the same time being a fine composition. According to the method of the present invention, the use of a specific dryer/grinder used under specific conditions makes it possible to obtain a reproducible slaked lime composition having fineness characteristics but also fluidity characteristics by controlling the water content and therefore controlling not only the grinding step but also the drying step while they are formed together in a single fluidification step.

This is because the size of the individual particles and the porosity properties of the slaked lime particles are defined by the slaking process. However, because of the large quantity of water used during this slaking step, the slaked lime particles that result therefrom, at the discharge from the hydrator, have a water content of 15% to 55% by weight, preferably 15% to 35% by weight, which acts as a bonding agent and binds the slaked lime particles together in the form of more bulky agglomerates.

By using specific dryer/grinders under specific conditions, according to the present invention it has been possible to disagglomerate and disperse the $Ca(OH)_2$ particles formed during the staking step, in particular by controlling their water content, in the form of individual particles without grinding them and consequently without impairing their properties (individual particle size, specific surface area, pore volume, etc).

"Residual non-solid phase content of the slaked lime composition" according to the present invention means the proportion of the non-solid residual phase of the slaked lime composition (that is to say the water content, such as the free-water content, and/or the residual additive content resulting from the method of producing said slaked lime composition, that is to say coming from additives added before, during or after the slaking of the quicklime) determined by a loss-on-ignition test.

The loss-on-ignition test consists of heating, under atmospheric pressure, approximately 20 g of the powdery slaked lime composition at a predetermined temperature, namely 110° C. or 180° C., and measuring the weight over time of the powdery composition by means of a thermal balance until the weight of the powder does not vary by more than 2 mg for at least 20 seconds. During the heating of the powder, all the components, in particular the non-solid components, having an evaporation temperature below that applied during the test are eliminated from the powder, and their content consequently corresponds to the loss of weight measured during the test. Consequently the non-solid residual phase contains all the non-solid components, in particular the liquid components, having together an evaporation temperature lower than that applied, which will then be eliminated from the slaked lime composition during the process of heating to the predetermined temperature. The percentage by weight of the non-solid residual phase and that of the remaining solid, referred to as the dry extract, are both calculated according to the weight of the product before and after ignition and are both expressed with respect to the weight of the product before the ignition test.

The loss-on-ignition result may therefore vary according to the temperatures used during the test. For example, it may be higher at 180° C. than at 110° C. if additives are used during or after the slaking process, and if these additives or their derived phases have an evaporation point above 110° C. and below 180° C., or form with the free water an azeotropic substance or an aqueous mixture that evaporates between these temperatures.

The non-solid residual-phase content of the powdery slaked lime composition according to the present invention can be measured by a loss-on-ignition test at 180° C. In such a case, the loss-on-ignition result is greater than or equal 0.3% by weight, preferably greater than or equal to 0.5% by weight and less than or equal to 3.5% by weight, preferably less than or equal to 3% by weight, in particular less than or equal to 2.5% by weight, in particular less than or equal to 2% by weight, and represents a quantity of water and/or substances that are contained therein having an evaporation point of less than or equal to 180° C.

The non-solid residual-phase content of the powdery slaked lime composition according to the invention can also be measured by a loss-on-ignition test at 110° C. In such a case, the loss-on-ignition is less than or equal to 3.2% by weight, preferably less than or equal to 2.7% by weight, advantageously less than or equal to 2.5% by weight, in particular less than or equal to 2% by weight, especially less than or equal to 1.5% by weight and greater than 0% by weight, preferably greater than or equal to 0.2% by weight, advantageously greater than or equal 0.3% by weight, in particular greater than or equal to 0.5% by weight, and represents principally the quantity of water and/or volatile substance that are contained therein having a evaporation point of less than or equal to 110° C., in particular water.

Advantageously, in the method according to the present invention, the drying/grinding step is performed until the powdery slaked lime composition has a non-solid residual-phase content, measured by a loss-on-ignition test at 180° C., equal to the following formula:

$$\text{LOI } 180° \text{ C.} \geq \text{LOI } 110° \text{ C.} + 0.2\%$$

where
- LOI 180° C. represent the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is greater than or equal to 2% by weight and less than or equal to 2.5% by weight with respect to the weight of the powdery slaked lime composition.

In another embodiment according to the present invention, the drying/grinding step is carried out until the powdery slaked lime composition has a non-solid residual-phase content, measured by a loss-on-ignition test at 180° C., equal to the following formula:

$$\text{LOI } 180° \text{ C.} \geq \text{LOI } 110° \text{ C.} + 0.3\%$$

where
- LOI 180° C. represent the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

Advantageously, in the method according to the present invention, the drying/grinding step is carried out until the powdery slaked lime composition has non-solid residual-phase content, measured by a loss-on-ignition test at 180° C., equal to the following formula:

$$\text{LOI } 180° \text{ C.} \geq \text{LOI } 110° \text{ C.} + 0.4\%$$

where
- LOI 180° C. represent the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

Preferably, in the method according to the present invention, the drying/grinding step is carried out until the powdery slaked lime composition has non-solid residual-phase content, measured by a loss-on-ignition test at 180° C., equal to the following formula:

$$\text{LOI } 180° \text{ C.} \geq \text{LOI } 110° \text{ C.} + 0.5\%$$

where
- LOI 180° C. represents the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

In another particular embodiment according to the present invention, the drying/grinding step is carried out until the powdery slaked lime composition has a non-solid residual-phase content, measured by a loss-on-ignition test at 110° C. greater than or equal to 0.3% by weight and less than 2% by weight.

According to the hydration method used during the production method, the slaked lime at the discharge from the hydrator may contain a greater or lesser water content. At the discharge from the hydrator, the quantity of water contained in the slaked lime composition causes the agglomeration of particles, but also a cohesive composition.

As mentioned previously, in the method according to the present invention, the slaking method is a semi-wet method, in which the quicklime is slaked by means of a sufficient quantity of water to obtain a slaked lime at the discharge from the hydrator containing a non-solid residual phase between 15% and 55% by weight, preferably between 15% and 35% by weight, with respect to the weight of slaked lime.

In the technology used for producing the slaked lime, the water content is reduced by performing a drying step since the final product must be in powder form. In the prior art, it is known that, in order to achieve a powder having fairly good fluidity, it is important to reduce the water content of the powder as far as possible.

Surprisingly, it has been found that, in order to obtain a powder having high fluidity, the non-solid residual-phase content of the powder measured by a loss-on-ignition test at 180° C. must be maintained between 0.3% by weight and 3.5% by weight with respect to the total weight of the powdery slaked lime composition. If the non-solid residual-phase content is reduced below 0.3% by weight, the fluidity of the powder decreases surprisingly and the composition becomes sticky (high adhesion), which is contradictory to the general knowledge of a person skilled in the art, according to which the non-solid residual-phase content of a power must be reduced as far as possible if a powder having good fluidity is required.

As already mentioned, water fulfils the role of a bonding agent between the particles of the powder, which may lead to the agglomeration of these particles and consequently to the formation of cohesive agglomerates. In order to improve the fineness of the powder particles, it is therefore important to eliminate the water from the composition in order to disperse and disagglomerate the particles.

Despite the fact that the dryer/grinder chosen in the method according to the present invention is capable of eliminating the water present in the composition and consequently of dispersing particles, it also enables the powder to keep good fluidity.

Consequently the method according to the present invention, by virtue of the use of a limited specific type of dryer/grinder under conditions intended to control the fineness, fluidity and water content, allows the production of a powdery slaked lime composition very effectively, which is not detrimental for the sorption properties since the porosity properties of the slaked lime composition are maintained and even increased.

This is because the simultaneous drying and grinding steps make it possible to obtain fine particles, while avoiding dogging and interruption of the process by virtue of improved fluidity.

Furthermore, the simultaneous drying and grinding steps afford better control of the properties of the slaked lime, which are more consistent over time from one production to another.

Without limiting the invention to this interpretation, it is thought that the execution of the drying and grinding step simultaneously in a single step makes it possible to better control the size of the particles of the resulting slaked lime, as well as to avoid the deterioration of its pore volume. Furthermore, the specific dryer/grinders used according to the present invention will also make it possible to carry out the drying within a very short period of time (Instantaneous drying), thus avoiding the risk of carbonation of the slaked lime, which is prejudicial to its porosity properties.

On the other hand, executing the drying step before the grinding step will lead to the formation of very solid rigid agglomerates of particles of slaked lime that will require higher energy to disagglomerate, with the additional risk of deterioration of the porosity of the slaked lime, while executing the grinding step before the drying step is very difficult to carry out industrially because of the problem of manipulation of the wet particles of slaked lime.

The reproducible side of the method according to the present invention, by making it possible to obtain high fluidity, despite the fineness of the slaked lime composition, without being detrimental to the porosity characteristic, makes it possible to obtain a very advantageous method from an economic point of view since the continuous character of the method is improved and the product prepared is more consistent in terms of quality, which avoids having to discard some productions not meeting the very high standard of the present markets.

This is because, according to the present invention, the combination of an improved control of the fineness and water content makes it possible to achieve a given reproducible quality of the powdery slaked lime composition with high porosity characteristics, as well as great fluidity.

The slaked lime composition manufactured by the method according to the present invention, when it emerges from the simultaneous drying and grinding step, also has a high BET specific surface area, reproducible from one production campaign to another, and lying between 30 $m^2/g$ and 55 $m^2/g$, preferably greater than or equal to 32 $m^2/g$, more preferably greater than equal to 35 $m^2/g$, more particularly greater than or equal to 38 $m^2/g$, such as, for example, greater than or equal to 40 $m^2/g$ and typically less than or equal to 50 $m^2/g$, in particular less than or equal to 48 $m^2/g$.

The expression "BET specific surface area" means, according to the present invention, the specific surface area measured by manometry with adsorption of nitrogen at 77 K after degassing under vacuum at a temperature between 150° C. and 250° C., in particular at 190° C. for at least two hours and calculated according to the multipoint BET method described in ISO 9277:2010E.

In addition, when it emerges from the simultaneous drying and grinding step of the method according to the invention, the highly porous powdery slaked lime composition also has a total BJH pore volume reproducible from one production campaign to another and which is greater than or equal to 0.15 $cm^3/g$, preferably greater than or equal to 0.17 $cm^3/g$, advantageously greater than or equal to 0.18 $cm^3/g$, more preferably greater than or equal to 0.19 $cm^3/g$, in particular greater than or equal to 0.20 $cm^3/g$, in particular greater than or equal to 0.21 $cm^3/g$ and typically less than 0.30 $cm^3/g$, in particular less than 0.28 $cm^3/g$.

The term "BJH pore volume" according to the present invention means the pore volume as measured by manometry with adsorption of nitrogen at 77 K after degassing under vacuum at a temperature between 150° and 250° C., in particular at 190° C. for at least two hours and calculated according to the BJH method, using the desorption curve.

The term "total pore volume", according to the present invention, means the BJH pore volume composed of the pores having a diameter of less than 1000 Ångströms.

Advantageously, the method according to the present invention is further characterised in that the drying and grinding step is carried out in a cage-type dryer/grinder, said cage-type dryer/grinder being composed of one, three or five wheels, such as for example, without being limited thereto, in a cage-type dryer/grinder marketed by PSP Engineering or Stedman™.

In another advantageous embodiment, the method according to the present invention is further characterised in that the drying and grinding step is carried out in a pin-type dryer/grinder, such as for example, without being limited thereto, in an Atritor Dryer-Pulverizer marketed by Atritor Umited.

In a variant, the method according to the present invention is further characterised in that the drying and grinding step is carried out in an instantaneous dryer/disagglomerator, such as for example, without being limited thereto, in the Anhydro Spin Flash Dryer® marketed by SPX Flow, the Drymeister® instantaneous dryer marketed by Hosokawa Micron Group or the Swirl Fluidizer™ dryer marketed by the GEA Group.

In this particular embodiment, a separator may further advantageously be added, on top of the drying chamber, for better control of the distribution of the particle sizes of the resulting dry powdery slaked lime composition.

In a particular embodiment, the method according to the present invention further comprises, before, during and/or after the step of slaking the lime and/or before, during and/or after the drying and grinding step, a step consisting of adding an additive to the quicklime, the slaking water and/or the slaked lime.

For example, the additive added during the method according to the present invention is diethylene glycol.

In this particular case, the diethylene glycol forms with the water a binary aqueous mixture that evaporates at temperatures above 110° C.

The quantity of water and the quantity of diethylene glycol contained in the powdery slaked lime composition may be respectively determined by carrying out a loss-on-ignition test both at 110° C., which will substantially indicate the quantity of water contained in the powdery slaked lime composition, and at 180° C., which will substantially indicate the quantity of water and diethylene glycol contained in the powdery slaked lime composition. In the present invention, it will be considered that the quantity of diethylene glycol will therefore correspond to the value obtained by subtracting the loss-on-ignition value obtained at 110° C. from the value obtained at 180° C.

In a variant, the additive added during the method may be an organic additive chosen from the group consisting of (mono-) or (poly-)ethylene glycol and (mono-) or (poly-)ethanolamine, in particular triethylene glycol, triethanolamine and mixtures thereof.

Advantageously, an alkaline metal compound chosen from the group consisting of hydroxides, carbonates, hydrogenocarbonates, nitrates, phosphates, persulfates and monocarboxylates of alkaline metals, such as acetates or formiates of alkaline metals, and mixtures thereof, in particular those of sodium, potassium and/or lithium and/or calcium stearate, may also be added during the method according to the present invention.

Preferably, the method according to the present invention is characterised in that the drying/grinding step is carried until the powdery slaked lime composition has a mean particle size $d_{50}$ of less than or equal to 10 µm, preferably less than or equal to 8 µm, advantageously less than or equal to 7 µm, in particular less than or equal to 6 µm.

The notation $d_x$ represents a diameter expressed in µm, measured by laser granulometry in methanol after sonication, with respect to which X % by volume of the particles measured have a smaller or equal size.

Advantageously, the method according to the present invention is characterised in that the drying/grinding step is carried out until the powdery slaked lime composition has a first fraction of particles having a size of less than 32 µm and a second fraction of particles having a size greater than 32 µm provided that the second fraction is less than or equal 50% by weight, preferably less than or equal to 40% by weight, advantageously less than or equal to 30% by weight, in particular less than or equal to 20% by weight, in particular less than or equal to 15% by weight, more preferably less than 10% by weight, or even less than or equal to 8% by weight, with respect to the total weight of the powdery slaked lime composition.

For reasons of simplicity, the term "second fraction of particles with a size greater than 32 µm" is also expressed by $R_{32}$ in the rest of the specification for the fraction retained at 32 µm.

In a particularly preferred embodiment of the method according to the present invention, hot air is supplied during the drying/grinding step, at a temperature of between 250° C. and 500° C., preferably between 350° and 400° C.

In a preferred embodiment of the method according to the present invention, the powdery slaked lime composition has, at the end of the drying/grinding step, a temperature of between 80° and 150° C., preferably between 90° and 130° C.

The temperature of the powdery slaked lime composition at the end of the drying/grinding step can be controlled by adjusting the temperature and/or the volume of the hot air supplied during the drying/grinding step and/or the mass flow rate of the wet slaked lime that enters in the drying/grinding step.

Advantageously, in the method according to the invention, the drying/grinding step has a duration of between a few seconds and a few minutes.

Other embodiments of the method according to the invention are mentioned in the accompanying claims.

The invention also relates to a fine powdery slaked lime composition comprising slaked lime particles having a BET specific surface area obtained by adsorption of nitrogen greater than or equal to 25 m²/g and a total BJH pore volume greater than or equal to 0.15 cm³/g, characterised in that the composition also has an Alpine fluidity greater than 50%, preferably greater than or equal 51%, more preferably greater than or equal to 52%, advantageously greater than or equal to 54%, in particular greater than or equal to 55%, and said composition mentioned above has a non-solid residual-phase content, measured by a loss-on-ignition test at 180° C., of less than or equal to 3.5% by weight, preferably less than or equal to 3% by weight, in particular less than or equal to 2.5% by weight, in particular less than or equal to 2% by weight and greater than or equal to 0.3%, preferably greater than or equal to 0.5% by weight, with respect to the total weight of the powdery slaked lime composition.

The slaked lime may contain the same impurities as those of the quicklime from which it is produced, such as magnesium oxide, MgO, sulphur oxide, $SO_3$, silica, $SiO_2$, or alumina, $Al_2O_3$, etc, the sum of which is at a level of a few percentages by weight. The impurities are expressed here in their oxide form, but of course they may appear in various phases.

In particular, the slaked lime according to the present invention may comprise magnesium in the form of MgO and/or $Mg(OH)_2$, in a quantity lying in the range from 0.5% to 10% by weight, preferably less than or equal to 5%, more preferably less than or equal 3% by weight, preferably above all less than or equal to 1% by weight, expressed in oxide form, with respect to the total weight of the slaked lime composition.

The slaked lime may also comprise calcium oxide, which may not have been entirely hydrated during the slaking step, or calcium carbonate $CaCO_3$. The calcium carbonate may come from the initial limestone (uncooked) from which said slaked lime is obtained (by means of calcium oxide), or come from a partial carbonation reaction of the slaked lime by contact with an atmosphere containing $CO_2$.

The quantity of calcium oxide in the slaked lime according to the present invention is generally less than or equal to 3% by weight, preferably less than or equal to 2% by weight and more preferably less than or equal to 1% by weight with respect to the total weight of slaked lime.

The quantity of $CO_2$ in the slaked lime (mainly in the form of $CaCO_3$) according to the present invention is generally less than or equal to 5% by weight, preferably less than or equal to 3% by weight, more preferably less than or equal to 2% by weight, with respect to the total weight of the slaked lime according to the present invention.

In a preferred embodiment, the quantity of available lime present in the powdery slaked lime composition according to the present invention is greater than or equal to 85% by weight, preferably greater than or equal to 87% by weight, preferentially greater than or equal to 90% by weight, advantageously greater than or equal to 92% by weight, or even greater than or equal to 95% by weight with respect to the proportion of dry matter in the slaked lime composition after LOI at 180° C.

In another preferred embodiment, the percentages by weight remaining consist mainly of compounds of limestone origin and residues originating from the non-solid residual phase.

The term "quantity of lime available" means, in the present invention, the quantity of calcium hydroxide and/or calcium oxide present in the powdery slaked lime composition, measured by a method described in EN-459-2 2010. More precisely, in the present invention, the available lime content present in the powdery slaked lime composition is determined by placing 0.5 g of powdery slaked lime composition in a sugar solution (15 g of sugar in 150 cm³ of demineralised water). The sugar solution will dissolve the available lime (namely the calcium oxide and/or calcium hydroxide) contained in the sample. The resulting mixture is stirred for at least 10 to 15 minutes in order to ensure complete dissolution and then titrated with a hydrochloric add solution (0.5 N HCl), phenolphthalein being used as an indicator. The concentration of Ca measured by this titration is next expressed in the form of $Ca(OH)_2$.

In a particular embodiment according to the present invention, the powdery slaked lime composition according to the invention has a non-solid residual-phase content, measured by a loss-on-ignition test at 110° C., of less than or equal to 3.2% by weight, preferably less than or equal to 2.7% by weight, advantageously less than or equal to 2.5% by weight, in particular less than or equal 2% by weight, especially less than or equal to 1.5% by weight and greater than 0% by weight, preferably greater than or equal to 0.2% by weight, advantageously greater than or equal to 0.3% by weight, in particular greater than or equal to 0.5% by weight.

In one embodiment, the powdery slaked lime composition according to the present invention has a non-solid residual-phase content, measured by a loss-on-ignition test at 180° C., equal to the following formula:

LOI 180° C.≥LOI 110° C.+0.2% where:
- LOI 180° C. represents the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is greater than or equal to 2% by weight and less than or equal to 2.5% by weight, with respect to the weight of the powdery slaked lime composition.

In another embodiment, the powdery slaked lime composition according to the present invention has a non-solid residual-phase content, measured by a loss-on-ignition test at 180° C., equal to the following formula:

LOI 180° C.≥LOI 110° C.+0.3% where
- LOI 180° C. represents the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

Advantageously, the powdery slaked lime composition according to the present invention has a non-solid residual-phase content, measured by a loss-on-ignition test at 180° C., equal to the following formula:

LOI 180° C.≥LOI 110° C.+0.4% where
- LOI 180° C. represents the non-solid residual-phase content of the powdery slaked lime composition measured by a loss-on-ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

Preferably, the powdery slaked lime composition according to the present invention has a non-solid residual-phase content, measured by a loss-on-ignition test at 180° C., equal to the following formula:

LOI 180° C.≥LOI 110° C.+0.5% where:
- LOI 180° C. represents the non-solid residual-phase content of the powdery slaked lime composition measured by a loss-on-Ignition test at 180° C. with respect to the weight of the powdery slaked lime composition;
- LOI 110° C. represents the non-solid residual-phase content of the powdery slaked lime composition measured by a loss-on-ignition test at 110° C. and is either less than 0.3% by weight or greater than 2.5% by weight and less than or equal to 3.2% by weight, with respect to the weight of the powdery slaked lime composition.

In another embodiment, the powdery slaked lime composition according to the present invention has a non-solid residual-phase content, measured by a loss-on-ignition test at 110° C., greater than or equal to 0.3% by weight, in particular greater than or equal to 2% by weight.

Preferably, the powdery slaked lime composition according to the present invention has a non-solid residual phase comprising water and/or residual additives (mineral and/or organic), free or bound to the lime compound.

Advantageously, the slaked lime particles of the powdery slaked lime composition according to the present invention have a particle size $d_{50}$ of less than or equal to 10 μm, preferably less than or equal to 8 μm, advantageously less than or equal to 7 μm, in particular less than or equal to 6 μm.

The notation $d_x$ represents a diameter expressed in μm, measured by laser granulometry in methanol after sonication, with respect to which X % by volume of the measured particles have a smaller or equal size.

Preferably, the powdery slaked lime composition according to the present invention comprises a first fraction of particles having a size of less than 32 μm and a second fraction of particles having a size greater than 32 μm provided that the second fraction is less than or equal to 50% by weight, preferably less than or equal to 40% by weight, advantageously less than or equal to 30% by weight, in particular less than or equal to 20% by weight, in particular less than or equal to 15% by weight, more preferably less than 10% by weight, or even less than or equal to 8% by weight, with respect to the total weight of the powdery slaked lime composition.

For reasons of simplicity, the expression "second fraction of particles having a size greater than 32 μm" is also expressed by $R_{32}$ in the rest of the specification for the fraction retained at 32 μm.

Advantageously, the powdery slaked lime composition according to the present invention comprises slaked lime particles having a BET specific surface area obtained by adsorption of nitrogen greater than or equal to 30 m²/g, preferably greater than or equal to 32 m²/g, advantageously greater than or equal to 35 m²/g.

In a particular preferred embodiment, the slaked lime particles of the powdery slaked lime composition according to the present invention have a BET specific surface area obtained by adsorption of nitrogen of less than or equal to 55 m²/g, preferably less than or equal to 50 m²/g, in particular less than or equal to 48 m²/g.

Preferably, the powdery slaked lime composition according the present invention contains slaked lime particles having a total BJH pore volume consisting of pores having a diameter of less than 1000 Å, obtained by desorption of nitrogen, greater than or equal to 0.17 cm³/g, in particular greater than or equal to 0.18 cm³/g, preferably greater than or equal to 0.19 cm³/g, in particular greater than or equal to 0.20 cm³/g, advantageously greater than or equal to 0.21 cm³/g.

In another embodiment of the invention, the slaked lime particles of the powdery slaked lime composition have a BJH pore volume, consisting of pores having a diameter of less than 1000 Å obtained by desorption of nitrogen, less than or equal to 0.30 cm$^3$/g, in particular less than 0.28 cm$^3$/g.

Preferably, the powdery slaked lime composition according to the present invention contains slaked lime particles having a BJH pore volume, consisting of pores having a diameter ranging from 100 to 300 Å, obtained by desorption of nitrogen, greater than or equal to 0.07 cm$^3$/g, preferably greater than or equal to 0.10 cm$^3$/g, advantageously greater than or equal to 0.11 cm$^3$/g, in particular greater than or equal to 0.12 cm$^3$/g and typically less than 0.15 cm$^3$/g, in particular less than 0.14 cm$^3$/g.

Advantageously, the powdery slaked lime composition according to the present invention contains slaked lime particles having a BJH pore volume, consisting of pores having a diameter ranging from 100 to 400 Å, obtained by desorption of nitrogen, greater than or equal to 0.09 cm$^3$/g, preferably greater than or equal to 0.12 cm$^3$/g, advantageously greater than or equal to 0.13 cm$^3$/g, in particular greater than or equal to 0.14 cm$^3$/g and typically less than 0.17 cm$^3$/g, in particular less than 0.16 cm$^3$/g.

In a particularly preferred embodiment, the powdery slaked lime composition according to the invention also has an alkaline phase characterised by an alkaline metal content greater than or equal to 0.2% by weight and less than or equal to 3.5% by weight with respect to the total weight of powdery slaked lime composition.

The alkaline phase may be in ionic form or in a bound form. Various types of salt may be added during the process, in particular an alkaline metal compound chosen from the group consisting of hydroxides, carbonates, hydrogenocarbonates, nitrates, phosphates, persulfates and the monocarboxylates of alkaline metals, such as acetates or formiates of alkaline metals and mixtures thereof, in particular those of sodium, potassium and/or lithium.

In another preferred embodiment, the powdery slaked lime composition according to the present invention also contains calcium stearate.

The powdery slaked lime composition is preferably obtained by the method according to the present invention.

Other embodiments of the powdery slaked lime composition according to the invention are mentioned in the accompanying claims.

The invention also relates to an industrial sorbent composition comprising at least said powdery slaked lime composition according to the invention.

The invention also relates to the use of the powdery slaked lime composition according to the present invention for purifying combustion gases.

In particular, the powdery slaked lime composition according to the present invention is used in a dry-method injection of sorbent.

Advantageously, the powdery slaked lime composition according to the present invention is used for capturing acid pollutants of combustion gases, such as HCL, HF, $SO_x$, $NO_x$, etc.

In a particular embodiment, the powdery slaked lime composition according to the present invention is used in an industrial sorbent composition, for example in combination with at least one other sorbent generally known for treating combustion gases, such as a sorbent chosen from the list of organic compounds, in particular active carbon, lignite coke and mixtures thereof, and inorganic compounds, in particular inorganic compounds known for capturing dioxins, furans and/or heavy metals, such as halloysite, sepiolite, bentonite or any sorbent described in the application DE 4034417.

Other embodiments of the use according to the invention are mentioned in the accompanying claims.

Other features and advantages of the invention will emerge more clearly in the light of the following description of a particular non-limitative embodiment of the invention, while referring to the FIGURES.

Figure 1:
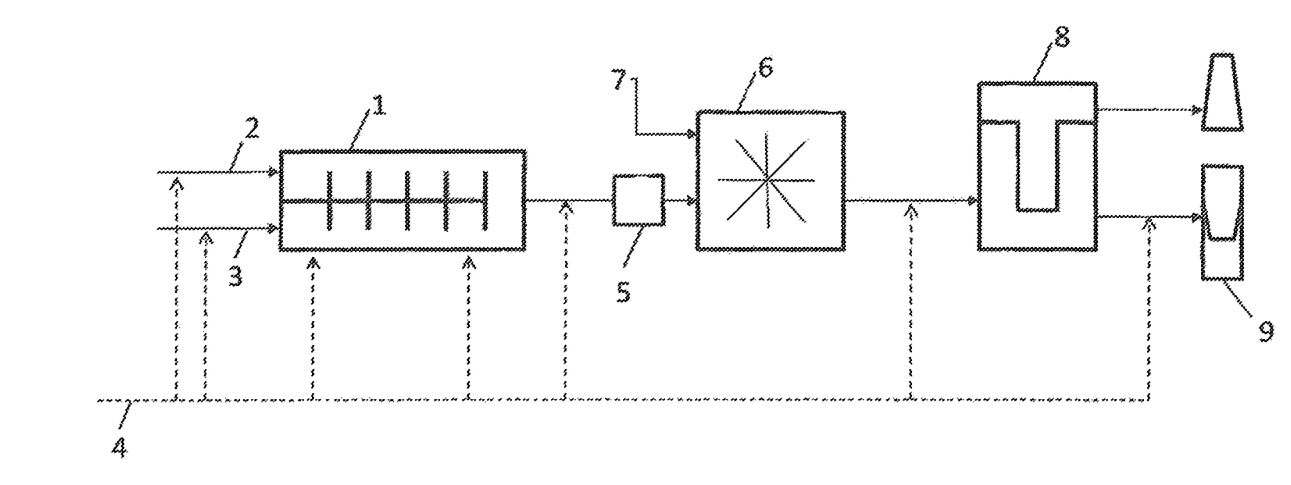
FIG. 1 shows a schematic diagram of an installation intended for preparing a highly porous powdery slaked lime composition according to the present invention.

The device shown in FIG. 1 comprises a slaking unit, also referred to as the hydrator 1. This hydrator 1 is supplied with quicklime by means of a feed conduit 2 and with water by means of a feed conduit 3. If an additive is used in the preparation of the absorbent, said additive is supplied by means of at least one feed conduit 4.

In one embodiment, said additive is first of all dissolved in a reservoir (not shown), from which it is pumped by means of a pump (not shown) and added to the slaking-water feed conduit 3 before entering the hydrator 1. In a variant, if necessary, the additive may also be added directly in the hydrator 1.

In another variant, the additive may also be added to the quicklime before slaking.

The additive may also be added after the hydrator, namely before the dryer/grinder, but also in the dryer/grinder or after the dryer/grinder.

At the discharge from the hydrator, the non-solid residual-phase content of the product is measured continuously by an infrared appliance 5. This non-solid residual-phase content is generally greater than 20% by weight. The product, wet slaked lime, is transferred into a dryer/grinder 6, which is supplied with hot air at approximately 400° C., by means of the feed conduit 7, which makes it possible to disagglomerate and dry the product. The final product is next separated from the drying airflow in a bag filter 8, and then directed to a storage silo 9.

The production installation according to the present invention is characterised in that the dryer/grinder 6 is chosen from the group consisting of a pin-type dryer/grinder, a cage-type dryer/grinder and an instantaneous dryer/disagglomerator.

The invention will now be described in more detail by means of non-limitative examples.

EXAMPLES

In the following examples, as in all the cases mentioned in the present document, the BET specific surface area is determined by manometry with adsorption of nitrogen at 77 K after degassing under vacuum at a temperature of between 150° and 250° C., in particular at 190° C. for at least 2 hours and calculated according to the multipoint BET method described in ISO 9277:2010E.

The BJH pore volume is measured by manometry with adsorption of nitrogen at 77 K after degassing under vacuum at a temperature between 150° and 250° C., in particular at 190° C. or at least 2 hours and calculated according to the BJH method, using the desorption curve for pores having a diameter of less than 1000 Å.

The total pore volume corresponds to the BJH pore volume composed of pores having a diameter of less than 1000 Angstroms.

The notation $d_x$ represents a diameter expressed in µm, measured by laser granulometry in methanol after sonication, with respect to which X % by volume of the particles measured have a size less than or equal to.

The loss-on-ignition test is carried out according to the operating method described previously.

The Alpine fluidity is measured on approximately 50 g of the powder sample, in accordance with the operating mode described previously.

Example 1

A highly porous powdery hydrated lime with high fluidity according to the invention is produced industrially by mixing water and quicklime in a hydrator (4.5 tonnes/hour of quicklime), in quantities such that the product emerges from the hydrator with a non-solid residual-phase content, measured by a loss-on-ignition test at 180° C., of 23% to 24% by weight. This wet hydrated lime is next transported and arrives in a pin-type dryer/grinder (Atritor Dryer-Pulverizer marketed by Atritor Limited) in which hot air is injected (approximately 20,000 Nm³/hour, 370° C.). In this pin-type dryer/grinder, the product is disagglomerated and dried simultaneously, because of the high temperature of the drying air and the rotation speed (850 rev/min) of the pin-type grinder, only a very short residence time of a few minutes is necessary in the pin-type grinder to achieve the target in terms of particle size and non-solid residual-phase content. The drying can therefore be considered to be instantaneous. Once dried and disagglomerated, the slaked lime product is separated from the air by a bag filter. During the transport of the dry slaked lime product from the pin-type dryer/grinder to the bag filter, a 100% solution of DEG is atomised by an atomisation nozzle in the pipe so as to create a DEG mist through which the slaked lime particles must pass. In this way, good contact between the particles and the DEG droplets is ensured, which produces a homogeneous product. The quantity of DEG corresponds to 0.3% by weight of the powdery slaked lime composition. This resulting powdery slaked lime composition has an Alpine fluidity of 57% and a non-solid residual-phase content of 0.5% by weight when measured by a loss-on-ignition test at 180° C., and 0.3% by weight when measured by a loss-on-ignition test at 110° C. The powdery slaked lime composition has a $d_{50}$ of 5 µm and a fraction of particles with a size greater than 32 µm of 10% by weight. Its BET specific surface area and its total pore volume are respectively 44.1 m²/g and 0.240 cm³/g.

Example 2

A highly porous powdery slaked lime composition with a high fluidity according to the invention is produced industrially by mixing water and quicklime in a hydrator (6 tonnes/hour of quicklime), in quantities such that the product emerges from the hydrator with a non-solid residual-phase content, measured by a loss-on-ignition test at 180° C., of between 17.4% and 21% by weight. This wet hydrated lime is next transported and arrives in a cage-type dryer/grinder (marketed by PSP Engineering) in which hot air is injected (12,500 Nm³/hour, 370° to 400° C.). The drying can therefore once again be considered to be instantaneous and the product emerges from the cage-type dryer/grinder at a temperature of around 120° C. to 125° C. The cage-type grinder is composed of five concentric wheels, two static wheels and the other three are rotating (rotation speed ranging up to 900 rev/min). As in example 1, once dried and disagglomerated, the slaked lime product is separated from the air by a bag filter. In this case, there is no addition of DEG after the drying, but a very small quantity (<0.1% by weight, expressed as a percentage by weight of quicklime) is added in the slaking water before hydration. The resulting powdery slaked lime composition has an Alpine fluidity of 60% and a non-solid residual-phase content, when measured by a loss-on-ignition test at 180° C., of 0.5% by weight. The powdery slaked lime composition has $d_{50}$ of 5 µm and a particle fraction with a size greater than 32 µm of 46% by weight. Its specific surface area and its total pore volume are respectively 42.0 m²/g and 0.225 cm³/g.

Example 3

A highly porous powdery slaked lime composition with a high fluidity according to the invention is produced industrially by mixing water and quicklime in a hydrator (6.8 tonnes/hour of quicklime), in quantities such that the product emerges from the hydrator with a non-solid residual-phase content, measured by a loss-on-ignition test at 186° C., of between 23% and 25% by weight. This wet hydrated lime is next transported and arrives in a cage-type dryer/grinder (marketed by Stedman™) in which hot air is injected (23,600 Nm³/hour, 260° to 290° C.). The cage-type grinder is composed of three concentric wheels (rotation speed of around 520 rev/min under standard conditions). Once again, once dried and disagglomerated, the slaked lime product is separated from the air by a bag filter. In this case, as in example 2, there is no addition of DEG after drying but 0.4% of DEG (expressed as a percentage by weight of quicklime) is added in the slaking water before hydration. The resulting powdery slaked lime composition has an Alpine fluidity of 52.3% and a non-solid residual-phase content of 0.7% by weight when measured by a loss-on-ignition test at 180° C., and 0.4% by weight when measured by a loss-on-ignition test at 110° C. The powdery slaked lime composition has a $d_{50}$ of 9.3 µm and a particle fraction with a size greater than 32 µm of 34.3% by weight. Its specific surface area and its total pore volume are respectively 41.1 m²/g and 0.209 cm³/g.

Example 4

A highly porous powdery slaked lime composition is produced industrially by mixing water and quicklime (2.7 tonnes/hour of quicklime) in a hydrator, in quantities such that the product emerges from the hydrator with a non-solid residual-phase content, measured by a loss-on-ignition (LOI) test at 180° C., of between 22% and 24% by weight. 0.2% of DEG (expressed as a percentage of the weight of quicklime) is added in the slaking water before hydration. The wet slaked lime that emerges from the hydrator is next transported to a pin-type dryer/grinder (Atritor Dryer-Pulverizer marketed by Atritor Limited) in which hot air is injected in order to instantaneously dry the wet slaked lime and to produce the highly porous powdery slaked lime composition before storing it in a storage area.

A representative sample of approximately 20 kg of this industrial powdery slaked lime composition is taken and analysed (BET specific surface area=41.1 m²/g, total pore volume=0.214 cm³/g, $d_{50}$=4.2 µm, $R_{32}$=6.2%).

Next a subsample of approximately 1 kg is dried further on a laboratory scale in an oven at 180° C. in order to obtain a fully dried slaked lime (non-solid residual phase measured by LOI at 180° C.=0.03% by weight). After this complete drying, the resulting completely dried slaked lime is mixed with various given quantities of water and/or diethylene glycol (DEG). The mixing is carried out by adding water and/or DEG drop by drop on the completely dried slaked lime, which is being stirred in an intensive laboratory mixer (Eirich ELI). When DEG and water are used together, the DEG is added to the water before the addition of this liquid solution to the completely dried slaked lime. The resulting mixture is stirred for 5 minutes and then subjected to a loss-on-ignition (LOI) test at 180° C. The results are presented in table 1 below, in which the percentages by weight are expressed with respect to the total weight of the powdery slaked lime composition.

The purpose of this methodology is to assess whether the non-solid residual-phase content, measured by LOI at 180° C., is representative of the sum of the quantity of water and of DEG present in the powdery slaked lime composition.

TABLE 1

| Quantity of water added (% by weight) | Quantity of DEG added (% by weight) | Total water and DEG (% by weight) | LOI measured at 180° C. (% by weight) | Variation (% by weight) |
|---|---|---|---|---|
| 0.3 | 0.2 | 0.5 | 0.4 | −0.10 |
| 0.8 | 0.2 | 1.0 | 1.1 | 0.14 |
| 1.3 | 0.2 | 1.5 | 1.5 | 0.01 |
| 1.8 | 0.2 | 2.0 | 2.0 | 0.04 |
| 0.5 | 0.5 | 1.0 | 0.8 | −0.18 |
| 1.0 | 0.5 | 1.5 | 1.5 | 0.04 |
| 1.5 | 0.5 | 2.0 | 1.9 | −0.06 |

As can be seen in table 1, the non-solid residual phase, measured by LOI at 180° C. in accordance with the operating method described previously, constitutes a good indicator of the sum of the water and DEG added in the laboratory to the completely dried slaked lime since the variation, which is the difference between the theoretical value and the measured value, is less than ±0.20%, most of the time less than ±0.10%.

Example 5

The following example is implemented in order to assess the influence of the non-solid residual-phase content, in particular of the water and/or DEG content of the powdery slaked lime composition, on its fluidity, all the other parameters being fixed, such as the particle size, the particle shape, the chemical composition, the specific surface area and the pore volume of the slaked lime composition.

In this regard, various samples of powdery slaked lime compositions are prepared from the completely dried slaked lime prepared in example 4 and to which various quantities of water and/or DEG are added by mixing. The Alpine fluidity of these powdery slaked lime compositions is measured in accordance with the procedure described previously. The results are presented in tables 2 and 3, in which the percentages by weight are expressed with respect to the total weight of the powdery slaked lime composition.

In this table, on the basis of the conclusion of example 4, we have considered that the sum of the quantity of water and DEG added to the completely dried slaked lime corresponds to the non-solid residual-phase content that we would have obtained if it had been measured by a loss-on-ignition test at 180° C. (theoretical LOI at 180° C.).

Likewise, we have considered that the quantity of water added to the completely dried slaked lime corresponds to the non-solid residual-phase content that we would have obtained if it had been measured by a loss of ignition test at 110° C. (theoretical LOI at 110° C.).

TABLE 2

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| EXAMPLE 5.1 | 0.7 | 0.0 | 0.7 | 59 |
| EXAMPLE 5.2 | 1.0 | 0.0 | 1.0 | 65 |
| EXAMPLE 5.3 | 1.4 | 0.0 | 1.4 | 60 |

It can be seen from table 2 that the powdery slaked lime compositions having a water content greater than or equal to 0.7% by weight and less than or equal to 1.4% by weight have good fluidity (Alpine fluidity greater than 50%), even without the addition of DEG.

TABLE 3

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| EXAMPLE 5.4 | 0.3 | 0.2 | 0.5 | 87 |
| EXAMPLE 5.5 | 0.8 | 0.2 | 1.0 | 83 |
| EXAMPLE 5.6 | 1.3 | 0.2 | 1.5 | 83 |
| EXAMPLE 5.7 | 1.8 | 0.2 | 2.0 | 68 |
| EXAMPLE 5.8 | 0.5 | 0.5 | 1.0 | 86 |
| EXAMPLE 5.9 | 1.0 | 0.5 | 1.5 | 88 |
| EXAMPLE 5.10 | 1.5 | 0.5 | 2.0 | 88 |

It can be seen from table 3 that the fluidity of the powdery slaked lime compositions having a water content greater than or equal to 0.3% by weight and less than 2% by weight can also be improved by the presence of diethylene glycol (DEG).

Comparative Example 1

The same procedure as in example 5 is followed, except that the water content is modified. The results are illustrated in tables 4 and 5.

TABLE 4

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| Comparative example 1.1 | 0.0 | 0.0 | 0.0 | 36 |
| Comparative example 1.2 | 0.0 | 0.2 | 0.2 | 45 |

It can be seen from table 4 that the powdery slaked lime compositions to which no water has been added after the complete drying on a laboratory scale have an Alpine fluidity of less than 50%. When diethylene glycol (DEG) is added in a quantity of 0.2% by weight with respect to the total weight of the powdery slaked lime composition, the fluidity is improved but remains less than 50%.

TABLE 5

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| Comparative example 1.3 | 2.0 | 0.0 | 2.0 | 40 |
| Comparative example 1.4 | 2.8 | 0.2 | 3.0 | 43 |
| Comparative example 1.5 | 3.0 | 0.0 | 3.0 | 27 |

It can be seen from table 5 that the powdery slaked lime compositions having a water content greater than or equal to 2% by weight have an Alpine fluidity of less than 50% and this fluidity decreases when the water content increases. For a water content of 2.8%, adding 0.2% DEG improves the fluidity, but not sufficiently to obtain an Alpine fluidity of greater than 50%.

The fluidity obtained with these samples is not sufficient to give a power suitable for an industrial application.

Example 6

The same procedure as in example 5 is followed except that various quantities of water and DEG are added to the completely dried slaked lime with the same method as that described in example 4. The results are mentioned in table 8.

TABLE 6

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| Comparative example 6.1 | 0.01 | 0.5 | 0.5 | 72 |

It can be seen from table 6 that it is possible to obtain powdery slaked lime compositions having a water content close to 0 (since no water was added to the completely dried sample in this case), however having good fluidity (Alpine fluidity greater than 50%) by adding diethylene glycol (DEG) so as to obtain a non-solid residual-phase content measured by a loss-on-ignition test at 180° C. of formula:

LOI 180° C.≥LOI 110° C.+0.3%

TABLE 7

| | Quantity of water added, ie theoretical LOI at 110° C. (% by weight) | Quantity of DEG added (% by weight) | Theoretical LOI at 180° C. (% by weight) | Alpine fluidity (%) |
|---|---|---|---|---|
| Comparative example 6.2 | 2.5 | 0.5 | 3.0 | 60 |

It can be seen from table 7 that it is possible to obtain powdery slaked lime compositions having a water content of greater than or equal to 2% by weight and less than or equal to 2.5% by weight, however having good fluidity (Alpine fluidity greater than 50%) by adding diethylene glycol (DEG) so as to obtain a non-solid residual-phase content measured by a loss-on-ignition test at 180° C. of formula:

LOI 180° C.≥LOI 110° C.+0.2%

Example 7

In this example, five industrial samples of powdery slaked lime produced according to the present invention, satisfying Alpine fluidity >50%, but with different Alpine fluidity values, are selected. The cohesion index is measured with a Granudrum apparatus (model Aptis from GranuTOOLS) using a rotation speed of 2 rev/min and a data analysis with Aptis Granudrum software. The results are presented in table 8 below.

TABLE 8

| Alpine fluidity | Granudrum cohesion index |
|---|---|
| 50% | 0.43 |
| 53% | 0.51 |
| 57% | 0.4 |
| 60% | 0.31 |
| 70% | 0.35 |

It can be seen from table 8 that, in general, an increase in the Alpine fluidity, referring to an improved flow behaviour of the powdery slaked lime, corresponds to a reduction in the cohesion index measured with the Granudrum.

Although the preferred embodiments of the invention have been described by way of illustration, a person skilled in the art knows that various modifications, additions or substitutions are possible, without departing from the scope and spirit of the invention as described in the accompanying claims.

The invention claimed is:

1. Method for producing a highly porous fine powdery slaked lime composition, comprising the steps consisting of:
    introducing quicklime into a feeding zone of a hydrator,
    introducing water into the feeding zone of the hydrator;
    slaking said quicklime in a slaking zone of the hydrator by means of a quantity of water that is sufficient to obtain a slaked lime having a non-solid residual-phase content of between 15% and 55% by weight;
    drying and grinding said slaked lime in order to form the powdery slaked lime composition, characterised in that said drying and grinding steps are performed simultaneously and are a single step of fluidification of the slaked lime in order to form said fine and highly porous fine powdery slaked lime composition having an Alpine fluidity greater than 50%, the Alpine fluidity AF being defined by the equation $$AF = \frac{m_i - m_{R\,90(T15;\ P100)}}{m_i - m_{R\,90(T120;\ P150)}} \cdot 100$$

where:
    $m_1$ is the is the initial mass of 50 g of powder distributed over a 90 μm sieve;
    $m_{R90(T15;\ P100)}$ is the mass of residues of material on the sieve after 15 seconds with a negative pressure at 100 mm of manometric liquid of density 0.88;
    $m_{R90(T120;\ P150)}$ is the mass of residues of material on the sieve after 15 seconds with a negative pressure at 100 mm of manometric liquid of density 0.88 and after 120 seconds with a negative pressure at 150 mm of manometric liquid of density 0.88;

said drying and grinding steps being carried out in a drier/grinder selected from the group consisting of a pin-type dryer/grinder, a cage-type dryer/grinder, an instantaneous dryer/disagglomerator and a combination of these until the highly porous fine powdery slaked lime composition has a residual non-solid phase content, measured by a loss-on-ignition test at 180° C., less than or equal to 3.5% by weight and greater than or equal to 0.3% by weight with respect to the total weight of the powdery slaked lime composition; and characterised in that the drying/grinding steps are performed until the powdery slaked lime composition has a first fraction of particles having a size less than 32 μm and a second fraction of particles having a size greater than 32 μm, provided that the second fraction is less than or equal to 50% by weight with respect to the total weight of the powdery slaked lime composition.

2. Method according to claim 1, characterised in that it further comprises, before, during and/or after the step of slaking the lime and/or before, during and/or after the drying and grinding steps, a step consisting of adding an additive to the quicklime, the slaking water and/or the slaked lime.

3. Method according to claim 1, characterised in that the drying/grinding steps are performed until the powdery slaked lime composition has a mean particular size $d_{50}$ of less than or equal to 10 μm.

4. Method according to claim 1, in which the hot air is supplied during the drying/grinding step, at a temperature between 250° C. and 500° C.

5. Method according to claim 1, in which the drying/grinding step has a duration of between a few seconds and a few minutes.

* * * * *